United States Patent

Osuka

(10) Patent No.: US 8,961,365 B2
(45) Date of Patent: Feb. 24, 2015

(54) POWER TRANSMISSION CONTROL APPARATUS FOR VEHICLE

(75) Inventor: Shinya Osuka, Nishio (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 0 days.

(21) Appl. No.: 14/004,233

(22) PCT Filed: Mar. 1, 2012

(86) PCT No.: PCT/JP2012/055219
§ 371 (c)(1),
(2), (4) Date: Sep. 10, 2013

(87) PCT Pub. No.: WO2012/144275
PCT Pub. Date: Oct. 26, 2012

(65) Prior Publication Data
US 2014/0004996 A1  Jan. 2, 2014

(30) Foreign Application Priority Data

Apr. 18, 2011 (JP) ................................ 2011-092124

(51) Int. Cl.
*B60W 20/00* (2006.01)
*B60W 10/11* (2012.01)
(52) U.S. Cl.
USPC ............... 477/5; 74/329; 74/335; 74/473.21
(58) Field of Classification Search
USPC ............... 477/5, 70, 79; 701/62; 74/329, 335, 74/473.21, 473.19
See application file for complete search history.

(56) References Cited

U.S. PATENT DOCUMENTS

| 5,337,848 | A | * | 8/1994 | Bader | ..................... 180/65.25 |
| 6,324,928 | B1 | | 12/2001 | Hughes | |
| 2014/0051547 | A1 | * | 2/2014 | Holmes et al. | ..................... 477/5 |
| 2014/0202282 | A1 | * | 7/2014 | Masui et al. | ..................... 74/661 |
| 2014/0208893 | A1 | * | 7/2014 | Masui et al. | ..................... 74/661 |
| 2014/0244089 | A1 | * | 8/2014 | Hattori | ..................... 701/22 |

FOREIGN PATENT DOCUMENTS

DE  102012217207 A1 * 3/2014
EP  0 902 219 A2  3/1999
(Continued)

OTHER PUBLICATIONS

English translation of DE2012217207A1, www.translationportal.cepo.org, Oct. 7, 2014.*

(Continued)

*Primary Examiner* — Roger Pang
(74) *Attorney, Agent, or Firm* — Burr & Brown, PLLC

(57) ABSTRACT

A manual transmission including an input shaft Ai receiving power from an internal combustion engine through a clutch, an output shaft Ao receiving power from an electric motor, an EV gear stage for EV travel (different from neutral) in which no power transmission route is established between Ai and Ao, and a plurality of gear stages for HV travel in which a power transmission route is established between Ai and Ao. The movement of a shift lever SL from the neutral position to an EV-gear-stage shift completion position and the movement of the shift lever SL from the neutral position to the EV-gear-stage shift completion position is permitted only in a state in which the clutch pedal CP is depressed to provide an HV-MT vehicle power transmission control apparatus that includes a mechanism requiring a driver to operate a clutch pedal at the time of gear change.

5 Claims, 24 Drawing Sheets

(56) References Cited

FOREIGN PATENT DOCUMENTS

| | | |
|---|---|---|
| EP | 2 492 161 A1 | 8/2012 |
| JP | 2000-224710 A1 | 8/2000 |
| JP | 2009-292313 A1 | 12/2009 |
| JP | 2010-254014 A1 | 11/2010 |
| JP | 2011-005904 A1 | 1/2011 |
| WO | 2011/048636 A1 | 4/2011 |

OTHER PUBLICATIONS

International Search Report and Written Opinion dated Mar. 27, 2012.

Extended European Search Report (Application No. 12773885.4) dated Sep. 22, 2014.

* cited by examiner

N POSITION

EV GEAR POSITION

2-ND GEAR POSITION

3-RD GEAR POSITION

4-TH GEAR POSITION

5-TH GEAR POSITION

<CLUTCH PEDAL NOT DEPRESSED>
N POSITION → EV GEAR POSITION: PROHIBITED
N POSITION → 2-ND GEAR POSITION: PERMITTED

<CLUTCH PEDAL NOT DEPRESSED>
N POSITION → EV GEAR POSITION: PROHIBITED
N POSITION → 2-ND GEAR POSITION: PERMITTED

<CLUTCH PEDAL DEPRESSED>
N POSITION → EV GEAR POSITION: PERMITTED
N POSITION → 2-ND GEAR POSITION: PERMITTED

US 8,961,365 B2

POWER TRANSMISSION CONTROL APPARATUS FOR VEHICLE

TECHNICAL FIELD

The present invention relates to a power transmission control apparatus for a vehicle, and more particularly to a power transmission control apparatus which is applied to a vehicle having an internal combustion engine and an electric motor as power sources and which includes a manual transmission and a friction clutch.

BACKGROUND ART

Conventionally, there has been widely known a so-called hybrid vehicle which includes an engine and an electric motor as power sources (see, for example, Japanese Patent Application Laid-Open (kokai) No. 2000-224710). In such a hybrid vehicle, there can be employed a structure in which the output shaft of the electric motor is connected to one of the output shaft of the internal combustion engine, the input shaft of a transmission, and the output shaft of the transmission. In the following description, drive torque from the output shaft of the internal combustion engine will be referred to as "engine drive torque," and drive torque from the output shaft of the electric motor as "motor drive torque."

In recent years, there has been developed a power transmission control apparatus applied to a hybrid vehicle which includes a manual transmission and a friction clutch (hereinafter referred to as an "HV-MT vehicle"). The term "manual transmission" used herein refers to a transmission which does not include a torque converter and whose gear stage is selected in accordance with the shift position of a shift lever operated by a driver (the manual transmission is denoted by MT). Also, the term "friction clutch" used herein refers to a clutch which is interposed between the output shaft of the internal combustion engine and the input shaft of the manual transmission and which is configured such that the engagement state of a friction plate changes in accordance with the operation quantity of a clutch pedal operated by the driver.

SUMMARY OF THE INVENTION

A hybrid vehicle can realize a state in which the vehicle travels utilizing both the engine drive torque and the motor drive torque (hereinafter referred to as "HV travel"). In recent years, there has been developed a hybrid vehicle which can realize not only such HV travel but also a state in which the vehicle travels utilizing only the motor drive torque while maintaining the internal combustion engine in a stopped state (a state in which rotation of the output shaft of the internal combustion engine is stopped) (hereinafter referred to as "EV travel").

In order to enable an HV-MT vehicle to realize such EV travel in a state in which a driver does not operate the clutch pedal (that is, the clutch is in an engaged state), it is necessary to drive the output shaft of the transmission using the motor drive torque, while maintaining a state in which the input shaft of the transmission does not rotate. For such operation, the output shaft of the electric motor must be connected to the output shaft of the transmission, and the transmission must be maintained in a "state in which no power transmission route is established between the input shaft of the transmission and the output shaft thereof."

In the following description, there is assumed a manual transmission which includes an "input shaft which receives power from an internal combustion engine (through a clutch)" and an "output shaft which receives power from an electric motor (i.e., to which the output shaft of the motor is always connected in a power transmissible manner)." Such a manual transmission can arbitrarily transmit the motor drive torque to the output shaft of the manual transmission (accordingly, drive wheels) irrespective of whether or not a power transmission route is established between the input and output shafts.

Accordingly, in order to realize not only HV travel but also the above-described EV travel by utilizing the manual transmission, the manual transmission must have not only a "gear stage (gear position) in which a power transmission route is established between the input and output shafts of the transmission" for HV travel (hereinafter referred to as the "HV travel gear stage"), but also a "gear stage (position) in which no power transmission route is established between the input and output shafts of the transmission" for EV travel (a gear stage other than the neutral; hereinafter referred to as the "EV travel gear stage").

That is, in such a manual transmission, when a shift level is moved on a shift pattern to an HV-travel-stage shift completion position corresponding to a selected one of a plurality of HV travel gear stages, a power transmission route having a "speed reduction ratio" corresponding to the selected HV travel gear stage is established between the input and output shafts; and when the shift level is moved on the shift pattern to an EV-travel-stage shift completion position corresponding to an EV travel gear stage (a position different from the neutral position), no power transmission route is established between the input and output shafts.

In the case of an HV-MT vehicle in which such a manual transmission is employed, a driver must depress the clutch pedal of the vehicle (bring its friction clutch to a disengaged state) in order to smoothly move the shift lever from the neutral position to the HV-travel-stage shift completion position. This operation is performed for the following reason. When an HV travel gear stage is selected, the internal combustion engine is operated, and a power transmission route is established between the input and output shafts of the transmission. Meanwhile, the driver is not required to depress the clutch pedal in order to smoothly move the shift lever from the neutral position to the EV-travel-stage shift completion position, for the following reason. When the EV travel gear stage is selected, the internal combustion engine is stopped, and no power transmission route is established between the input and output shafts of the transmission.

In other words, the driver needs to depress the clutch pedal or does not need to depress the clutch depending on which gear stage the driver selects. This makes the driver confused about whether to depress the clutch pedal at the time of gear change. In order to avoid such confusion, it is preferred to employ a mechanism which demands the driver to depress the clutch pedal so as to move the shift lever from the neutral position to the EV-travel-stage shift completion position.

An object of the present invention is to provide a power transmission control apparatus for an HV-MT vehicle which includes a plurality of "HV travel gear stages" and an "EV travel gear stage" and which has a mechanism for demanding a driver to operate a clutch operation member at the time of gear change irrespective of the gear stage selected by the driver.

The feature of a power transmission control apparatus for a vehicle according to the present invention resides in that the manual transmission (transmission mechanism) includes a movement restraining mechanism. The movement restraining mechanism refers to a mechanism which prohibits movement of a shift operation member from the neutral position to an EV-travel-stage shift completion position in a state in which the clutch operation member is not operated (is not depressed), and permits movement of the shift operation member from the neutral position to the EV-travel-stage shift completion position in a state in which the clutch operation member is operated (is depressed).

In the case where the above-described movement restraining mechanism is employed, a driver is demanded to operate (depress) the clutch operation member so as to move the shift operation member from the neutral position to the EV-travel-stage shift completion position. In other words, the operation of the clutch operation member is demanded when the shift operation member is moved from the neutral position to the shift completion position of any gear stage. As a result, it is possible to prevent occurrence of a situation where the driver is confused about whether to operate the clutch operation member at the time of gear change.

The above-described movement restraining mechanism may be a mechanism for prohibiting motion of the shift operation member itself so as to prohibit movement of the shift operation member from the neutral position to the EV-travel-stage shift completion position in a state in which the clutch operation member is not operated, or a mechanism for prohibiting motion of a member (e.g., a shift and selection shaft to be described later or a specific fork shaft to be described later) which is linked to the shift operation member.

Preferably, the above-described movement restraining mechanism includes a lock mechanism which prohibits movement of the shift operation member from the EV-travel-stage shift completion position in a state in which the clutch operation member is not operated, and permits movement of the shift operation member from the EV-travel-stage shift completion position in a state in which the clutch operation member is operated. By virtue of this configuration, as in the case where the driver returns the shift operation member from the HV-travel-stage shift completion position to the neutral position, the driver is further demanded to operate (depress) the clutch operation member when the driver returns the shift operation member from the EV-travel-stage shift completion position to the neutral position.

In other words, the driver is further demanded to operate the clutch operation member when the driver moves the shift operation member from the shift completion position of any gear-stage to the neutral position. As a result, it is possible to more reliably prevent occurrence of a situation where the driver is confused about whether to operate the clutch operation member at the time of gear change.

MODE FOR CARRYING OUT THE INVENTION

Figure 1:
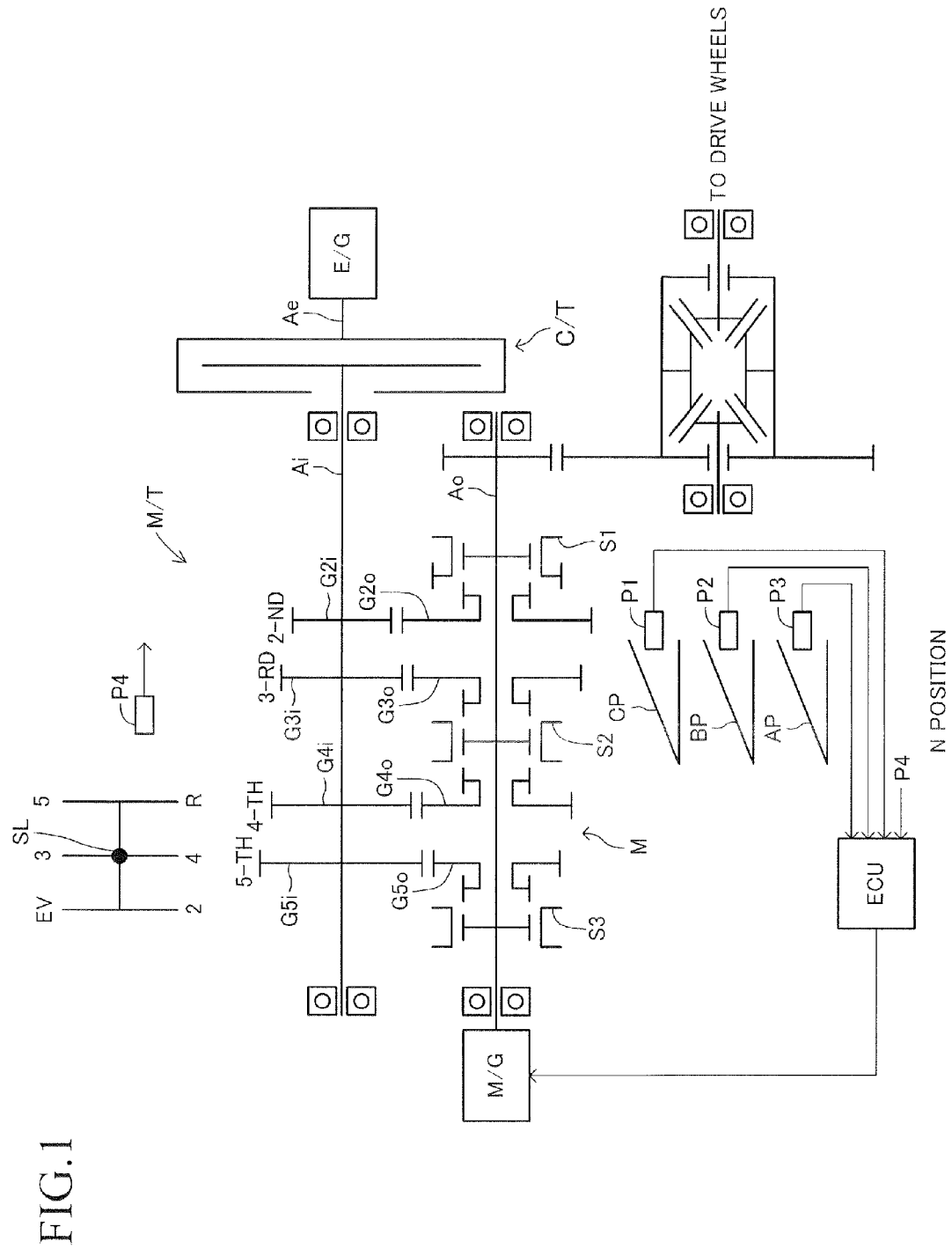
FIG. 1 is a schematic diagram of a power transmission control apparatus for an HV-MT vehicle according to an embodiment of the present invention in a state in which an neutral (N) position is selected.

A power transmission control apparatus for a vehicle according to an embodiment of the present invention (hereinafter referred to as the "present apparatus") will now be described with reference to the drawings. As shown in FIG. 1, the present apparatus is applied to a "vehicle which includes an engine E/G and a motor generator M/G as power sources, and also includes a manual transmission M/T, which does not include a torque converter, and a friction clutch C/T"; i.e., the above-described "HV-MT vehicle." This "HV-MT vehicle" may be a front wheel drive vehicle, a rear wheel drive vehicle, or a four wheel drive vehicle.

(Overall Structure)

First, the overall structure of the present apparatus will be described. The engine E/G is a well known internal combustion engine, such as a gasoline engine which uses gasoline as fuel, or a diesel engine which uses light oil as fuel.

The manual transmission M/T is a transmission which does not include a torque converter and whose gear stage is selected in accordance with the shift position of a shift lever SL operated by a driver. The manual transmission M/T has an input shaft Ai which receives power from an output shaft Ae of the engine E/G, an output shaft Ao which receives power from the motor generator M/G and outputs power to drive wheels of the vehicle. The input shaft Ai and the output shaft Ao are disposed in parallel with one another. The output shaft Ao may be the output shaft of the motor generator M/G or a shaft which is parallel to the output shaft of the motor generator M/G and is always connected to the output shaft of the motor generator M/G via a gear train in a power transmissible manner. The details of the structure of the manual transmission M/T will be described later.

The friction clutch C/T is disposed between the output shaft Ae of the engine E/G and the input shaft Ai of the manual transmission M/T. The friction clutch C/T is a well known clutch configured such that the engagement state of a friction plate (more specifically, the axial position of a friction plate, which rotates together with the input shaft Ai, in relation to a fry-wheel, which rotates together with the output shaft Ae) changes in accordance with an operation quantity (depression amount) of a clutch pedal CP operated by the driver.

The engagement state of the friction clutch C/T (the axial position of the friction plate) may be mechanically adjusted in accordance with the operation quantity of the clutch pedal CP, by making use of a link mechanism or the like which mechanically connects the clutch pedal CP to the friction clutch C/T (the friction plate). Alternatively, the engagement state of the friction clutch C/T may be electrically adjusted by making use of drive force of an actuator which operates in accordance with the operation quantity of the clutch pedal CP detected by a sensor (a sensor P1 to be described later) (by a so-called by-wire scheme).

The motor generator M/G has a well known structure (e.g., an AC synchronous motor), and its rotor (not illustrated) rotates together with the output shaft Ao. Namely, a power transmission route is always established between the output shaft of the motor generator M/G and the output shaft Ao of the manual transmission M/T. In the following description, drive torque from the output shaft Ae of the engine E/G will be referred to as "EG torque," and drive torque from the output shaft of the motor generator M/G (the output shaft Ao) as "MG torque."

The present apparatus includes a clutch operation quantity sensor P1 which detects the operation quantity (depression amount, clutch stroke, etc.) of the clutch pedal CP, a brake operation quantity sensor P2 which detects the operation quantity (depression force, presence/absence of operation, etc.) of a brake pedal BP, an accelerator operation quantity sensor P3 which detects the operation quantity (accelerator opening) of an accelerator pedal AP, and a shift position sensor P4 which detects the position of the shift lever SL.

Moreover, the present apparatus includes an electronic control unit ECU. On the basis of information, among others, from the above-mentioned sensors P1 to P4 and other sensors, etc., the ECU controls the EG torque by controlling the fuel injection amount of the engine E/G (opening of its throttle valve) and controls the MG torque by controlling an inverter (not shown).

(Structure of M/T)

The structure of the manual transmission M/T will be described specifically with reference to FIGS. 1 to 4. As can be understood from the shift pattern of the shift lever SL shown in FIGS. 1 and 4, in the present example, five forward gear stages (an EV gear stage and 2-nd to 5-th gear stages) and a single reverse gear stage (R) are provided as selectable gear stages (shift completion positions). In the following description, description regarding the reverse gear stage (R) is not provided. The "EV gear stage" is the above-described EV travel gear stage, and each of the "2-nd gear stage" to the "5-th gear stage" is the above-described HV travel gear stage. In the following, in order to facilitate the description, a range which includes an "N position," an "EV-2 selection position," and a "5-R selection position" and in which selection operation is possible will be referred to as a "neutral zone."

The manual transmission M/T includes sleeves S1, S2, and S3. The sleeves S1, S2, and S3 are a sleeve for "2-nd gear," a sleeve for "3-rd gear—4-th gear," and a sleeve for "5-th gear", which are fitted onto corresponding hubs which rotate together with the output shaft Ao such that the sleeves cannot rotate relative to the corresponding hubs but can move in the axial direction relative to the corresponding hubs.

Figure 2:
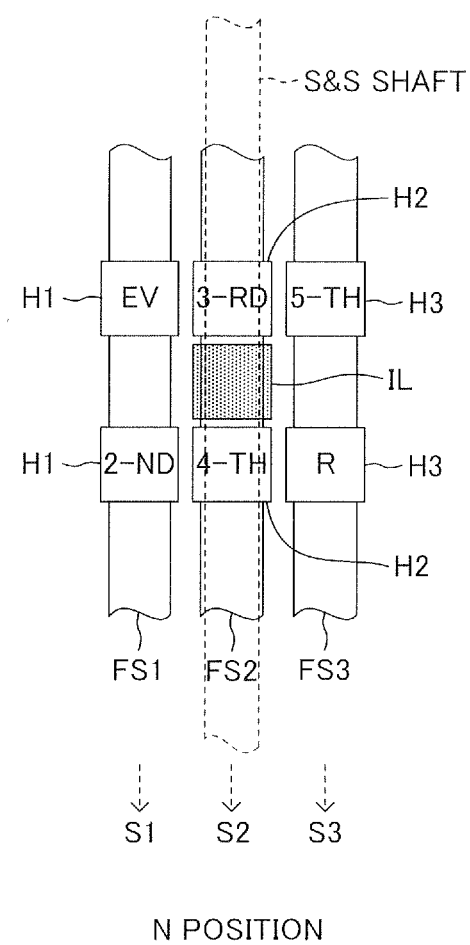
FIG. 2 is a schematic diagram showing the positional relation between an S&S shaft and a plurality of fork shafts in a state in which the N position is selected.
Figure 3:
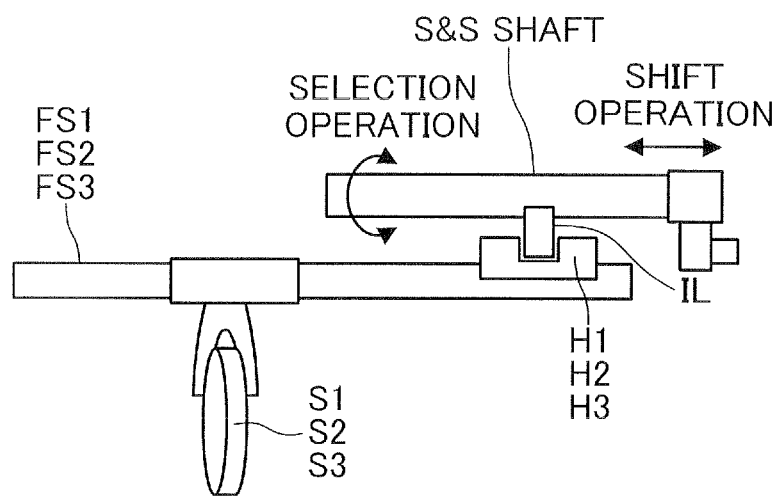
FIG. 3 is a schematic view showing the state of engagement between "sleeves and fork shafts" and the S&S shaft.
Figure 4:
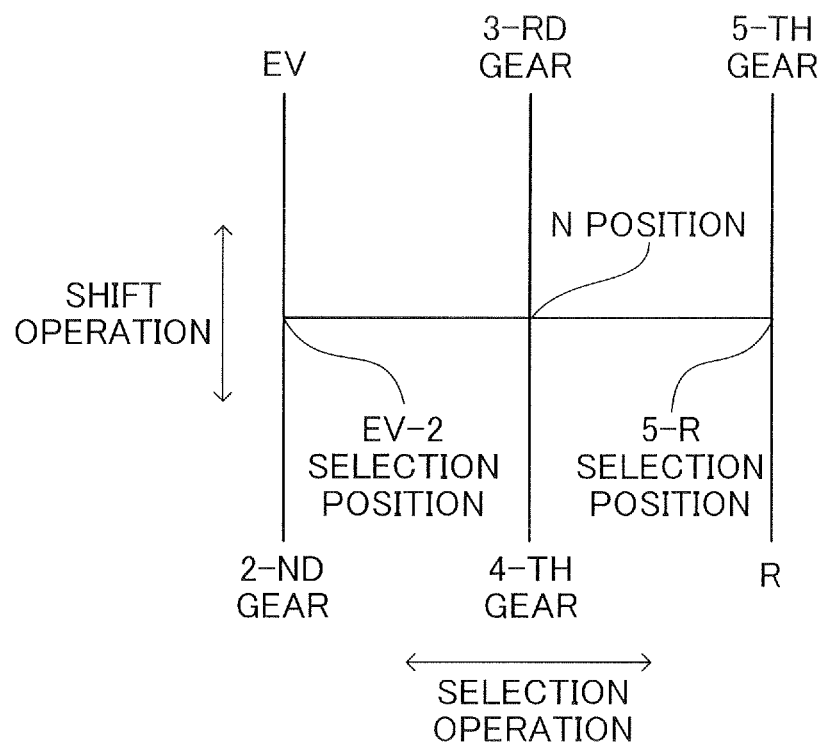
FIG. 4 is a diagram showing the details of a shift pattern.

As shown in FIGS. 2 and 3, the sleeves S1, S2, and S3 are integrally coupled with fork shafts FS1, FS2, and FS3 (through forks). The fork shafts FS1, FS2, and FS3 (accordingly, the sleeves S1, S2, and S3) are selectively driven in the axial direction (the vertical direction in FIG. 2, the left-right direction in FIGS. 1 and 3) by an inner lever IL (see FIGS. 2 and 3) provided on an S&S shaft linked to the shift lever SL.

The S&S shaft shown in FIGS. 2 and 3 is a "selection-rotation type" S&S shaft which translates in the axial direction as a result of the shift operation (operation in the vertical direction in FIGS. 1 and 4) of the shift lever SL and rotates about the axis as a result of the selection operation (operation in the left-right direction in FIGS. 1 and 4) of the shift lever SL. However, the S&S shaft may be a "shift-rotation type" S&S shaft which rotates about the axis as a result of the shift operation of the shift lever SL and translates in the axial direction as a result of the selection operation of the shift lever SL.

As shown in FIG. 3, shift heads H1, H2, and H3 are integrally provided on the fork shafts FS1, FS2, and FS3. When the position of the shift lever SL moves from the "neutral zone" toward the front side or the rear side of the vehicle as a result of the shift operation (operation in the front-back direction of the vehicle), i.e., when the axial position (the position in the left-right direction in FIG. 3) of the inner lever IL moves in either direction from a reference position corresponding to the "neutral zone," the inner lever IL pushes a selected one of the shift heads H1, H2, and H3 in the axial direction, whereby selected one of the fork shafts FS1, FS2, and FS3 (accordingly, the sleeves S1, S2, and S3) moves from the "neutral position."

In the present embodiment, the "2-nd gear" corresponds to the above-mentioned "specific gear stage." Accordingly, of the sleeves S1 to S3, the sleeve S1 corresponds to the above-mentioned "specific sleeve," and, of the fork shafts FS1 to FS3, the fork shaft FS1 corresponds to the above-mentioned "specific fork shaft." In the below, these gear stages will be described one by one.

As shown in FIGS. 1 and 2, when the shift lever SL is in the "N position" (more accurately, the neutral zone), all the sleeves S1, S2, and S3 are in their "neutral positions." In this state, the sleeves S1, S2, and S3 are not engaged with the corresponding idle gears. Namely, no power transmission route is established between the input shaft Ai and the output shaft Ao.

Figure 5:
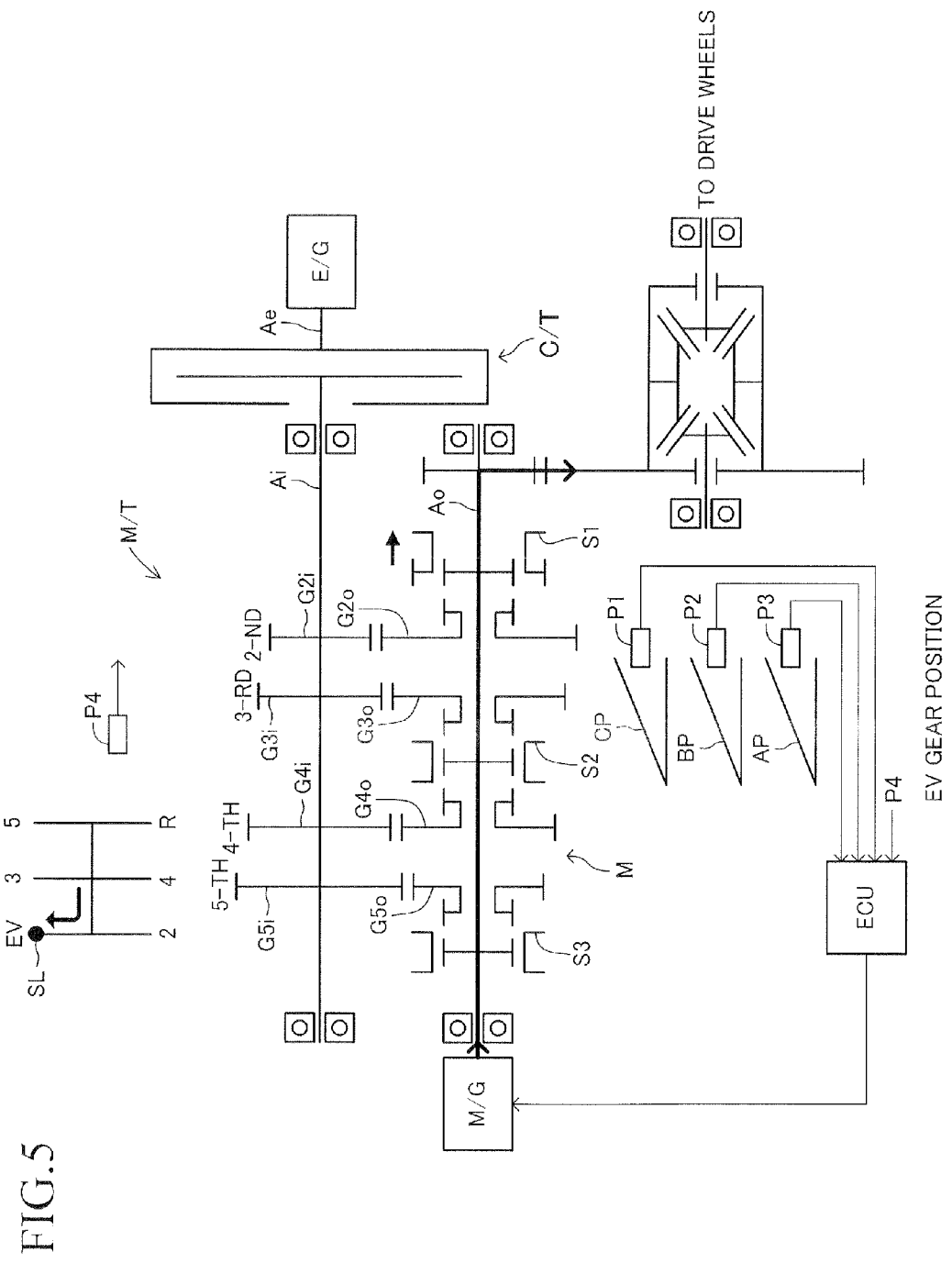
FIG. 5 is a diagram corresponding to FIG. 1 and showing a state in which an EV gear position is selected.
Figure 6:
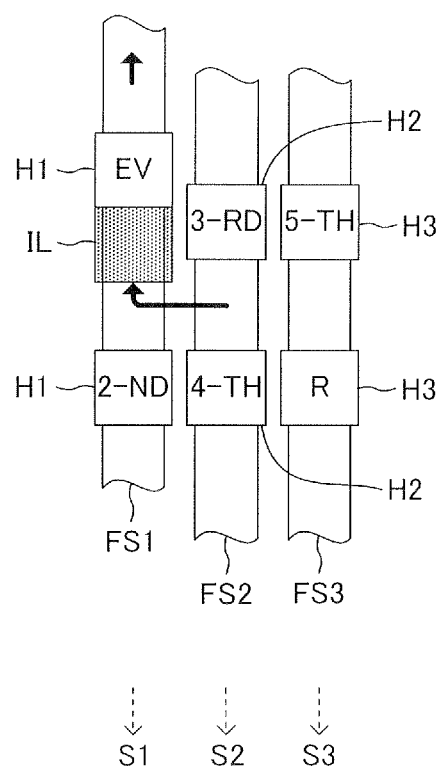
FIG. 6 is a diagram corresponding to FIG. 2 and showing a state in which the EV gear position is selected.

As shown in FIGS. 5 and 6, when the shift lever SL moves from the "N position" to the "EV-gear-stage shift completion position" (via the EV-2 section position), the inner lever IL of the S&S shaft drives the "EV-side engagement portion" of the head H1 coupled to the fork shaft FS1 in an "EV" direction (upward in FIG. 6), whereby only the fork shaft FS1 (accordingly, the sleeve S1) is driven (upward in FIG. 6, rightward in FIG. 5). As a result, the sleeve S1 moves to the "EV gear position." The sleeves S2 and S3 are in their "neutral positions."

In this state, there does not exist an idle gear which engages with the sleeve S1. Accordingly, as indicated by a thick continuous line in FIG. 5, no power transmission route is established between the input shaft Ai and the output shaft Ao, and a power transmission route is established only between the motor generator M/G and the output shaft Ao. Namely, when the "EV gear" is selected, there is realized a state in which the vehicle travels using the MG torque only, while maintaining the engine E/G in a stopped state (a state in which rotation of the output shaft Ae of the engine E/G is stopped) (i.e., the above-described "EV travel"). That is, in this vehicle, a driver can start the vehicle by EV travel by selecting the "EV gear." Notably, the "N position" (the neutral zone) and the "EV position" can be distinguished from each other on the basis of, for example, an output from the shift position sensor P4, an output from a sensor which detects the position of the S&S shaft, or the like. Notably, by the action of a "movement restricting mechanism" to be described later, movement of the shift lever SL from the "N position" to the "EV-gear-stage shift completion position" is prohibited unless the clutch pedal CP is depressed.

Figure 7:
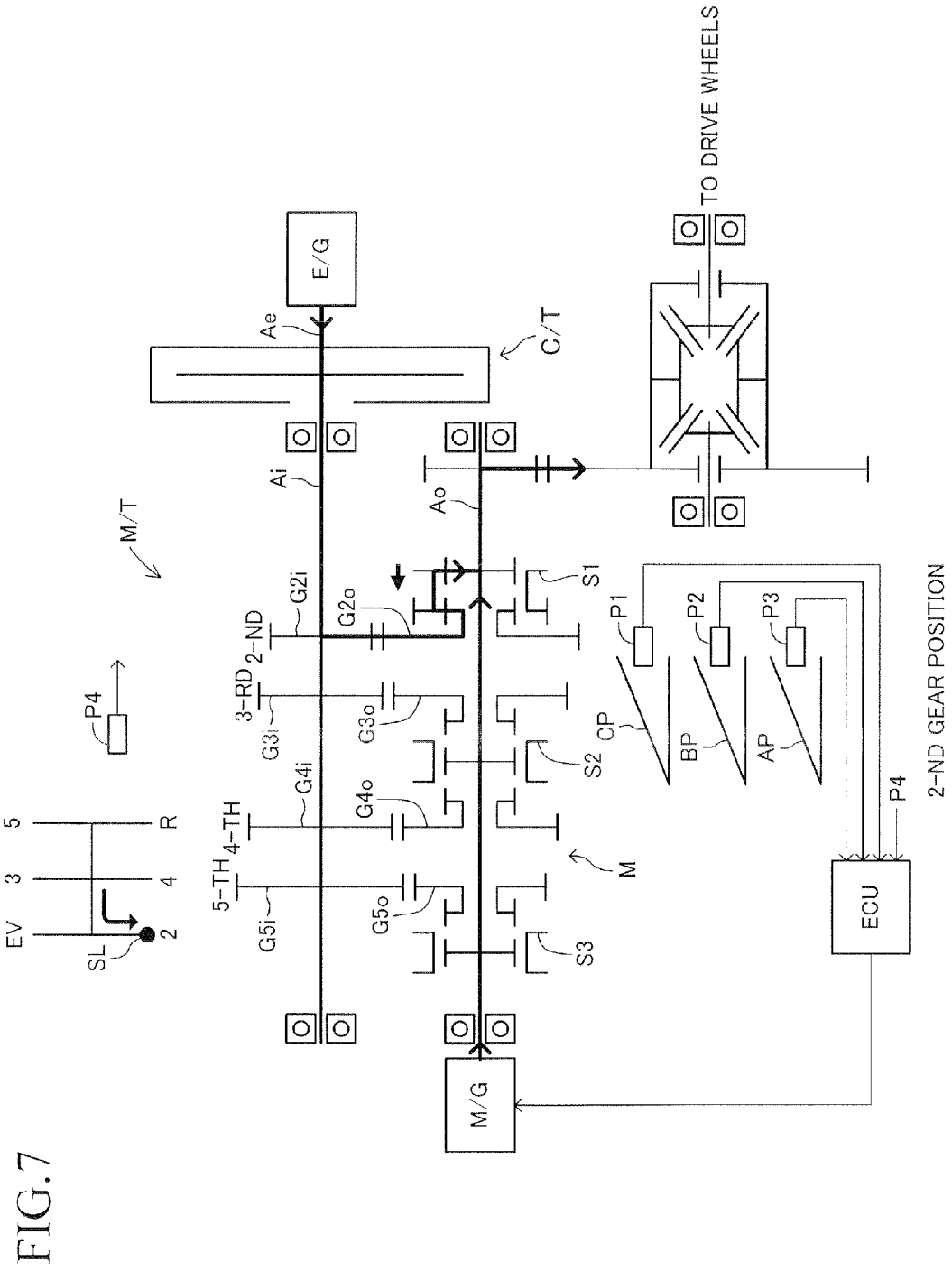
FIG. 7 is a diagram corresponding to FIG. 1 and showing a state in which a 2-nd gear position is selected.
Figure 8:
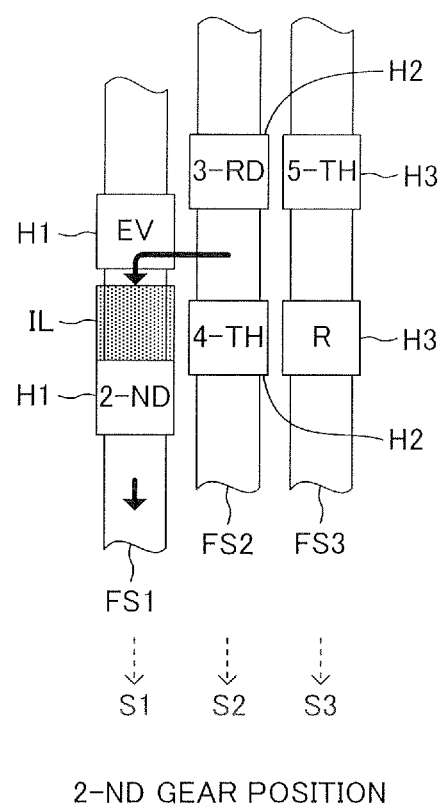
FIG. 8 is a diagram corresponding to FIG. 2 and showing a state in which the 2-nd gear position is selected.
Figure 9:
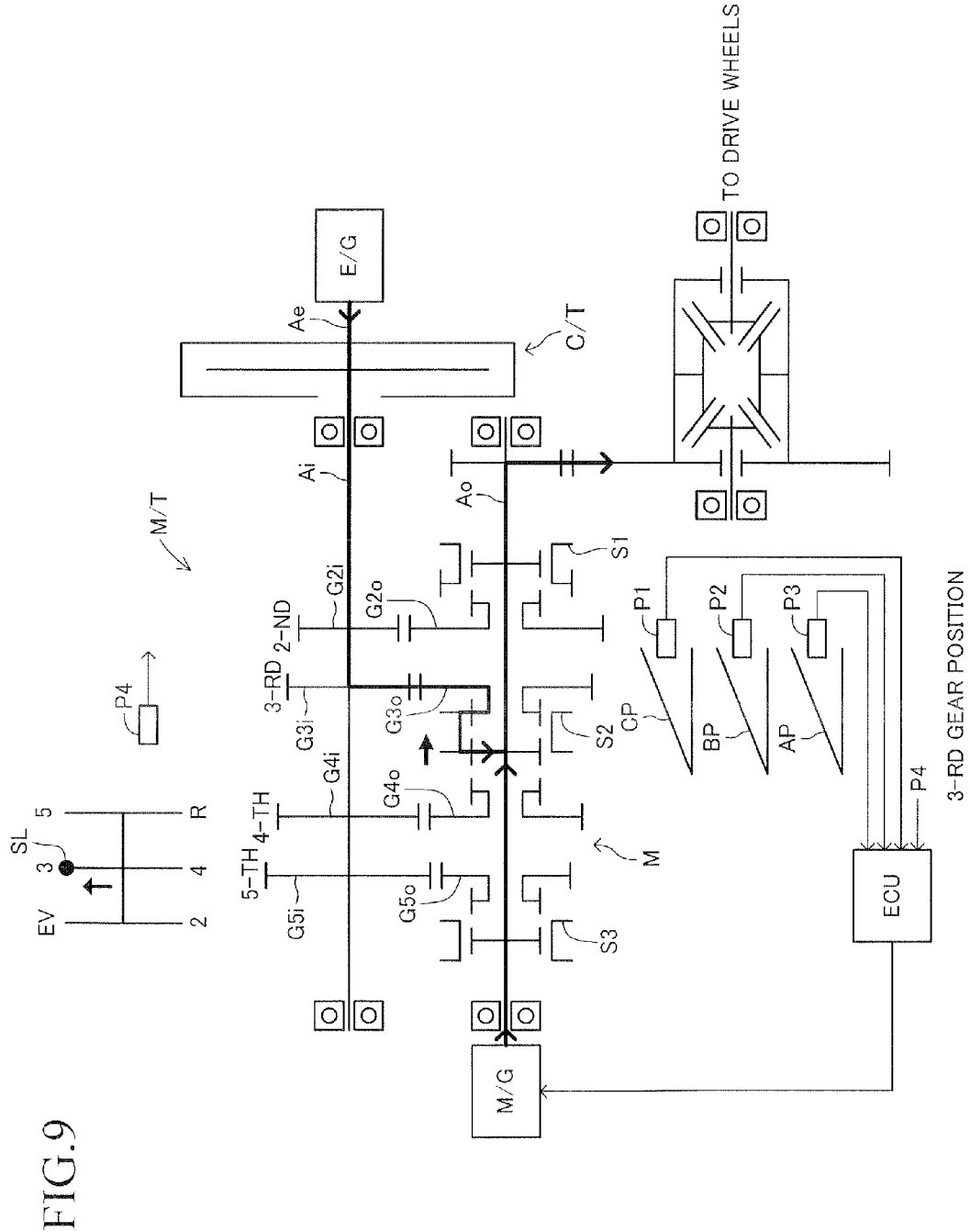
FIG. 9 is a diagram corresponding to FIG. 1 and showing a state in which a 3-rd gear position is selected.
Figure 10:
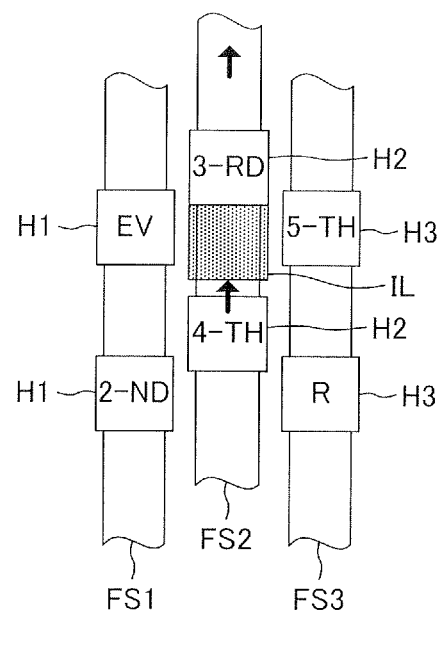
FIG. 10 is a diagram corresponding to FIG. 2 and showing a state in which the 3-rd gear position is selected.
Figure 11:
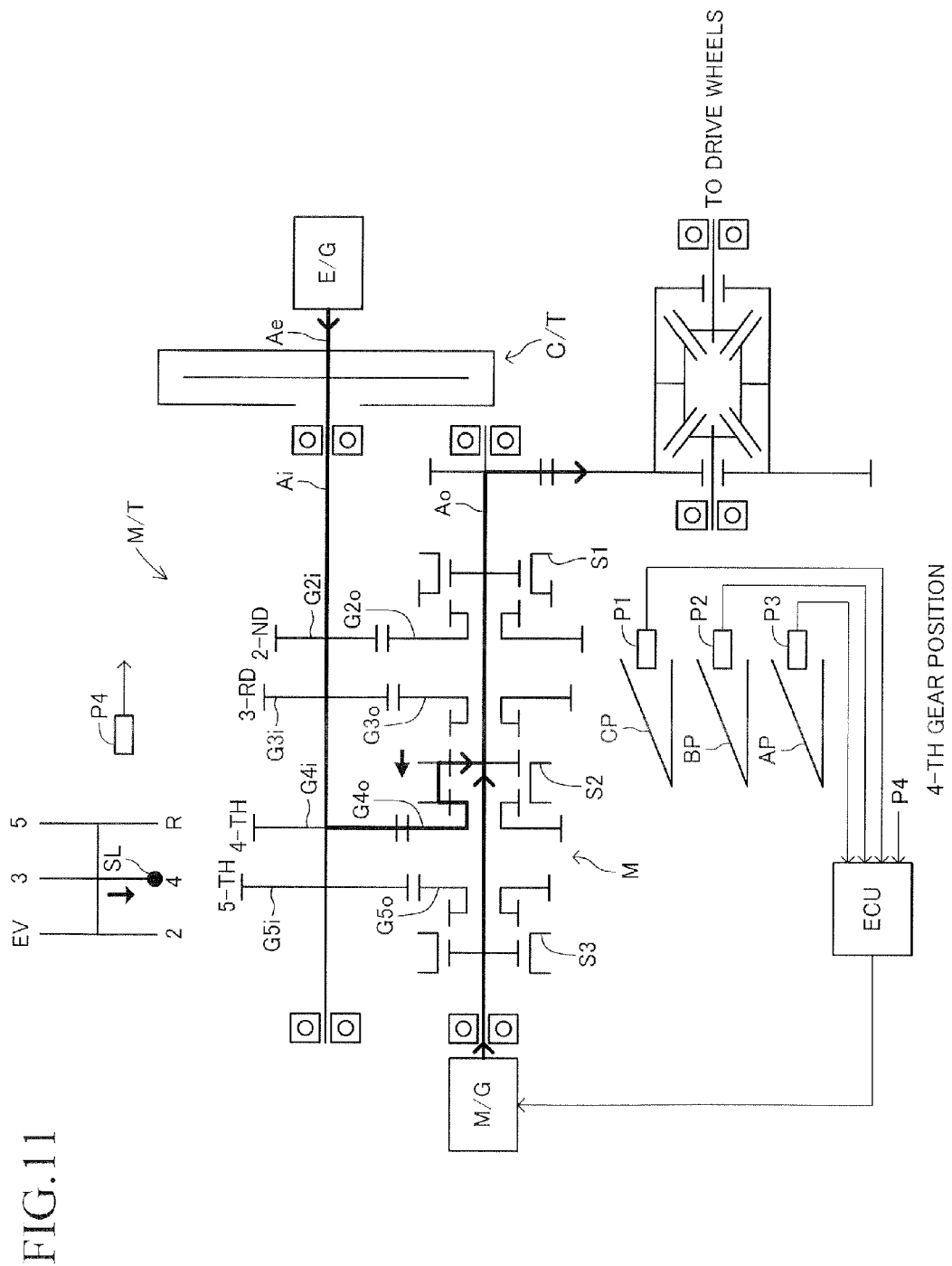
FIG. 11 is a diagram corresponding to FIG. 1 and showing a state in which a 4-th gear position is selected.
Figure 12:
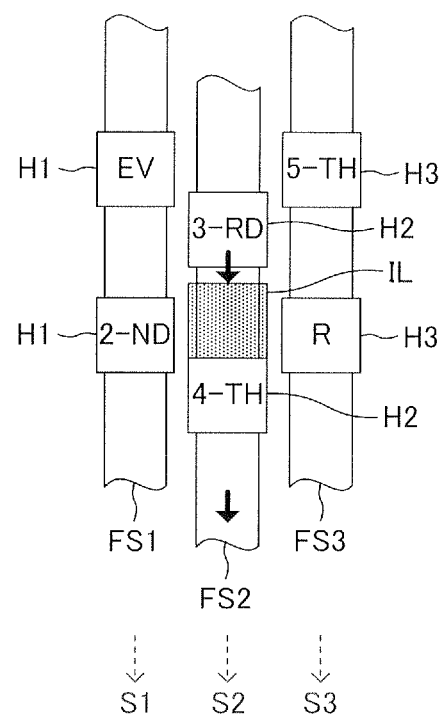
FIG. 12 is a diagram corresponding to FIG. 2 and showing a state in which the 4-th gear position is selected.
Figure 13:
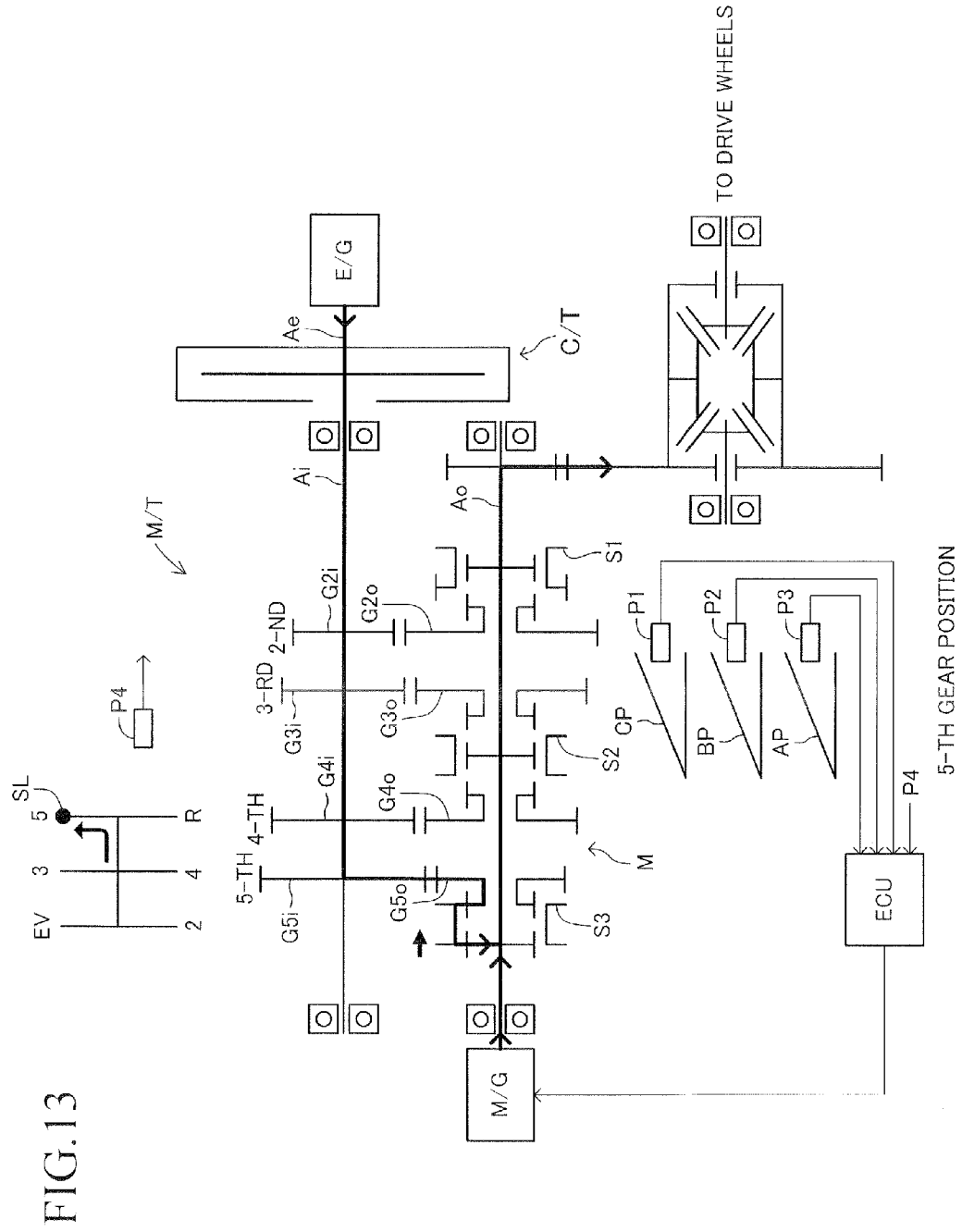
FIG. 13 is a diagram corresponding to FIG. 1 and showing a state in which a 5-th gear position is selected.
Figure 14:
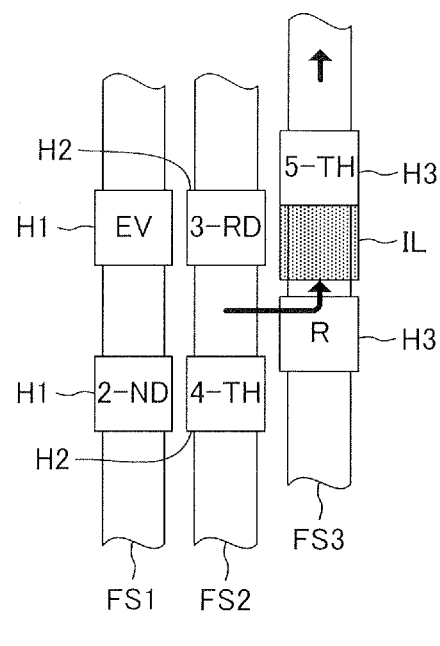
FIG. 14 is a diagram corresponding to FIG. 2 and showing a state in which the 5-th gear position is selected.

As shown in FIGS. 7 and 8, when the shift lever SL moves from the "N position" to the "2-nd-gear-stage shift completion position" (via the EV-2 section position), the inner lever IL of the S&S shaft drives the "2-nd-side engagement portion" of the head H1 coupled to the fork shaft FS1 in an "2-nd" direction (downward in FIG. 8), whereby only the fork shaft FS1 (accordingly, the sleeve S1) is driven (downward in FIG. 8, leftward in FIG. 7). As a result, the sleeve S1 moves to the "2-nd gear position." The sleeves S2 and S3 are in their "neutral positions."

In this state, the sleeve S1 engages with an idle gear G2*o*, and fixes the idle gear G2*o* to the output shaft Ao such that the idle gear G2*o* cannot rotate in relation to the output shaft Ao. The idle gear G2*o* always meshes with a stationary gear G2*i* fixed to the input shaft Ai. As a result, as indicated by a thick continuously line in FIG. 7, a power transmission route is established between the motor generator M/G and the output shaft Ao, and a power transmission route having a speed reduction ratio for the "2-nd gear" is established between the input shaft Ai and the output shaft Ao via the "gears G2*i* and G2*o*." Namely, when the "2-nd gear" is selected, there is established a state in which the vehicle travels through use of both the MG torque and the EG torque transmitted through the clutch C/T) (i.e., the above-described "HV travel").

As shown in FIGS. 9 to 14, in the case where the shift lever SL is in the "3-rd gear," the "4-th gear," or the "5-th gear," as in the case where the shift lever SL is in the "2-nd gear," the above-described "HV travel" is realized. Namely, in each of the "3-rd gear," the "4-th gear," and the "5-th gear," in addition to the power transmission route between the motor generator M/G and the output shaft Ao, a power transmission route having a speed reduction ratio for the "3-nd gear" the "4-th gear," or the "5-th gear," is established between the input shaft Ai and the output shaft Ao via "gears G3*i* and G3*o*," "gears G4*i* and G4*o*," or "gears G5*i* and G5*o*."

In the present example, only the "EV gear" is the gear stage for EV travel," and the "2-nd gear" to the "5-th gear" are the gear stages for HV travel." Herein, the "ratio of the rotational speed of the input shaft Ai to that of the output shaft Ao" will be referred to as the "MT speed reduction ratio." The MT speed reduction ratio (the number of teeth of the gear GNo/the number of teeth of the gear GNi) (N: 2 to 5) degreases gradually from the "2-nd gear" toward the "5-th gear."

In the above-described example, the positions of the sleeves S1 to S3 in the axial direction are mechanically adjusted in accordance with the shift position of the shift lever SL through use of, for example, a link mechanism (the S&S shaft and the fork shafts) which mechanically connects the shift lever SL and the sleeves S1 to S3. However, the positions of the sleeves S1 to S3 in the axial direction may be electrically adjusted (by a so-called by-wire scheme) by using the drive force of an actuator which operates on the basis of the shift position detected by the shift position sensor P4.

(Control of the Engine E/G)

The control of the engine E/G by the present apparatus is generally performed as follows. When the vehicle is stopped or the "N (neutral)" or the "EV gear" is selected, the engine E/G is maintained in a stopped state (a state in which fuel injection is not performed). When a gear stage for HV travel (any of the "2-nd gear" to the "5-th gear") is selected in a state in which the engine E/G is stopped, the engine E/G is started (fuel injection is started). In periods during which the engine E/G is operating (fuel injection is being performed), the EG torque is controlled on the basis of the accelerator opening, etc. When the "N" or the "EV gear" is selected or the vehicle stops in a state in which the engine E/G is operating, the engine E/G is again maintained in the stopped state.

(Control of the Motor Generator M/G)

The control of the motor generator M/G by the present apparatus is generally performed as follows. When the vehicle is stopped or the "N" is selected, the motor generator M/G is maintained in a stopped state (the MG torque=0). When the "EV gear" is selected in a state in which the motor generator M/G is in the stopped state, normal start control utilizing the MG torques is started. In the normal start control, the MG torque is controlled on the basis of the accelerator opening and the clutch stroke. The MG torque in the normal start control is determined by making use of a map or the like which is previously created for an "ordinary vehicle which includes a manual transmission and a friction clutch and which includes an internal combustion engine only as a power source," the map defining the relation between "accelerator opening and clutch stroke" and "torque of the internal combustion engine transmitted to the input shaft of the manual transmission via the clutch" for the cases where the vehicle starts in the "1-st gear." After completion of the normal start control, the MG torque is controlled on the basis of the accelerator opening, etc. when the "EV gear" is selected or one of the "2-nd gear" to the "5-th gear" (a plurality of gear stages for HV travel) is selected. When the vehicle stops, the motor generator M/G is again maintained in the stopped state.

(Specific Configuration of the Movement Restraining Mechanism)

Various embodiments of the movement restraining mechanism will be briefly described one by one with reference to FIGS. 15 to 26.

First Embodiment

Figure 15:
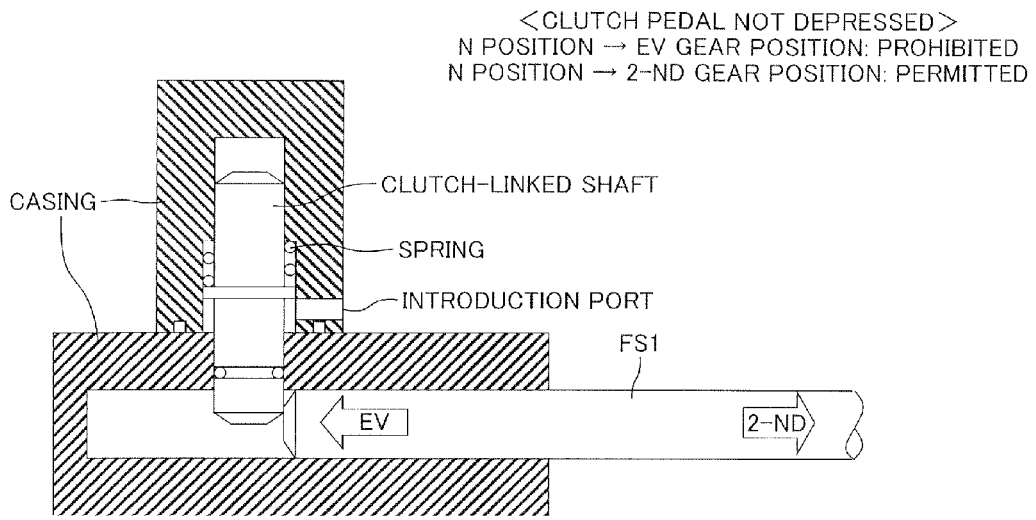
FIG. 15 is a schematic view of a first example of a movement restraining mechanism in a state in which a clutch pedal is not depressed.
Figure 16:
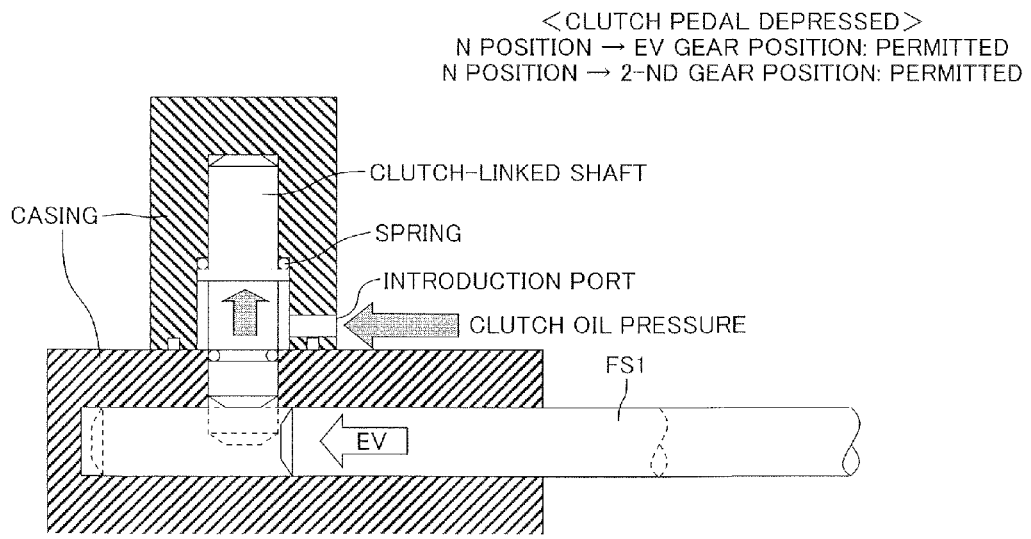
FIG. 16 is a view corresponding to FIG. 15 and showing a state in which the clutch pedal is depressed.
Figure 17:
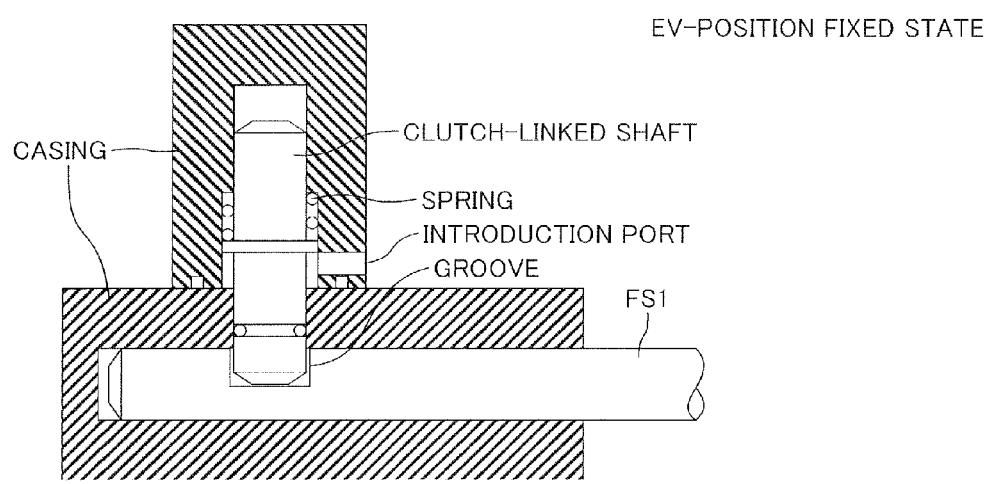
FIG. 17 is a view corresponding to FIG. 15 and showing a state in which a shift lever is fixed to an EV-gear-stage shift completion position.

As shown in FIGS. 15 to 17, in the first embodiment, there is provided a clutch-linked shaft which can move in the axial direction within the casing of the manual transmission M/T. The axis (moving direction) of the clutch-linked shaft intersects the axis (moving direction) of the fork shaft FS1 and is orthogonal thereto.

FIG. 15 shows a state in which the fork shaft FS1 is in the neutral position and the clutch pedal CP is not depressed. In this state, due to the urging force of a spring which always urges the clutch-linked shaft downward in FIG. 15, the clutch-linked shaft is located at a lower position, and its lower end portion projects into a moving space on the EV side (left side in FIG. 15) of the fork shaft FS1. As a result, an EV-side end portion (left-side end portion) of the fork shaft FS1 butts against the lower end portion of the clutch-linked shaft. Thus, movement of the fork shaft FS1 from the neutral position to the EV position (leftward movement in FIG. 15) is prohibited. In other words, movement of the shift lever SL from the N position (more specifically, the EV-2 selection position) to the EV-gear-stage shift completion position is prohibited. Meanwhile, movement of the fork shaft FS1 from the neutral position to the 2-nd gear position (rightward movement in FIG. 15; i.e., movement of the shift lever SL from the N position to the 2-nd-gear-stage shift completion position) is permitted.

FIG. 16 shows a state in which the fork shaft FS1 is in the neutral position and the clutch pedal CP is depressed. In this state, due to the "hydraulic pressure generated in accordance with the operation of the clutch pedal CP" (hereinafter referred to as the "clutch oil pressure") which is introduced into the interior of the casing through an introduction port of the casing, the clutch-linked shaft moves upward in FIG. 16 against the urging force of the spring. As a result, the lower end portion of the clutch-linked shaft retreats from the moving space on the EV side of the fork shaft FS1. Thus, movement of the fork shaft FS1 from the neutral position to the EV position (leftward movement in FIG. 16) is permitted. In other words, movement of the shift lever SL from the N position (more specifically, the EV-2 selection position) to the EV-gear-stage shift completion position is permitted. Furthermore, movement of the fork shaft FS1 from the neutral position to the 2 gear position (rightward movement in FIG. 16; i.e., movement of the shift lever SL from the N position to the 2-nd-gear-stage shift completion position) is also permitted.

The cultic oil pressure is generated by one of known configurations in accordance with the operation quantity (depression amount) of the clutch pedal CP. In this first embodiment, through utilization of the cultic oil pressure, the clutch-linked shaft is moved in the axial direction in accordance with the operation of the clutch pedal CP. However, the first embodiment may be modified such that, through utilization of, for example, tension of a wire generated in accordance with the operation quantity (depression amount) of the clutch pedal CP, the clutch-linked shaft is moved in the axial direction in accordance with the operation of the clutch pedal CP.

FIG. 17 shows a modification of the first embodiment. FIG. 17 shows a state in which the fork shaft FS1 is in the EV position and the clutch pedal CP is not depressed. In this modification, a groove is formed on the side surface of the fork shaft FS1. When the fork shaft FS1 is in the EV position, the lower end portion of the clutch-linked shaft can engage with the groove. As a result, unless the clutch pedal CP is depressed, movement of the fork shaft FS1 from the EV position (i.e., movement of the shift lever SL from the EV-gear-stage shift completion position) is prohibited. That is, the movement restraining mechanism of the modification of the first embodiment includes the above-mentioned "lock mechanism."

Second Embodiment

Figure 18:
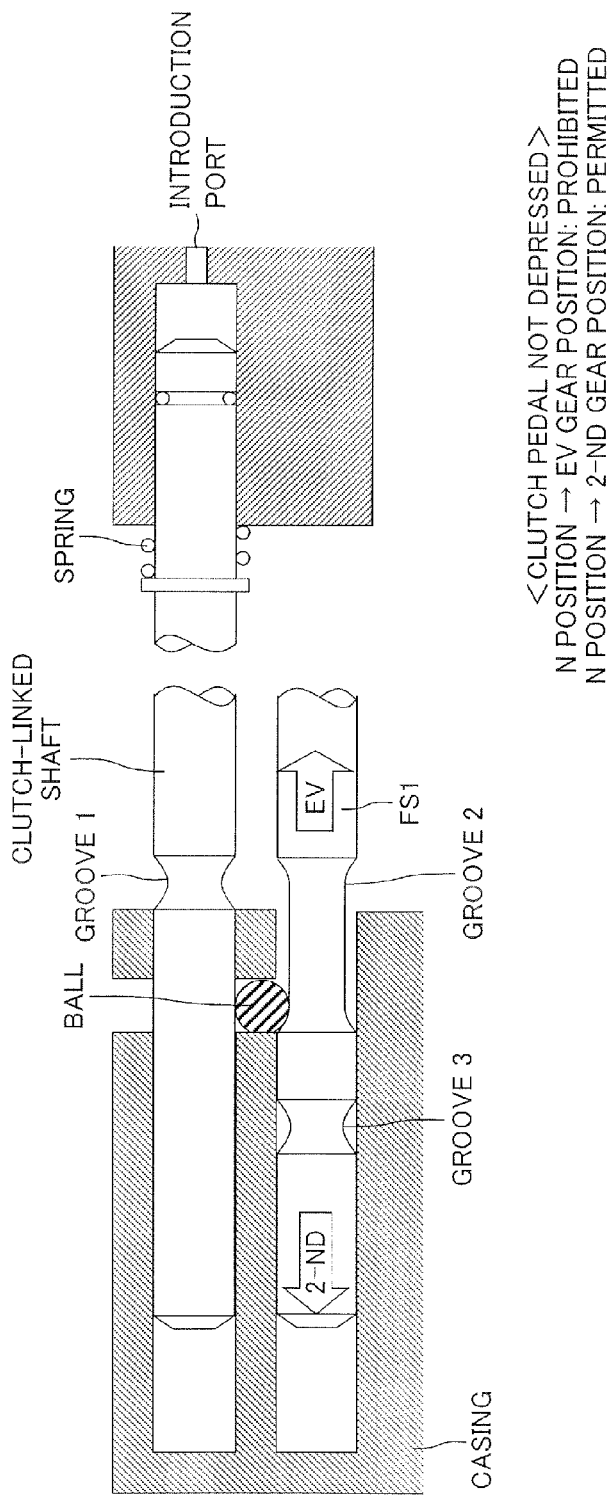
FIG. 18 is a schematic view of a second example of the movement restraining mechanism in a state in which the clutch pedal is not depressed.
Figure 19:
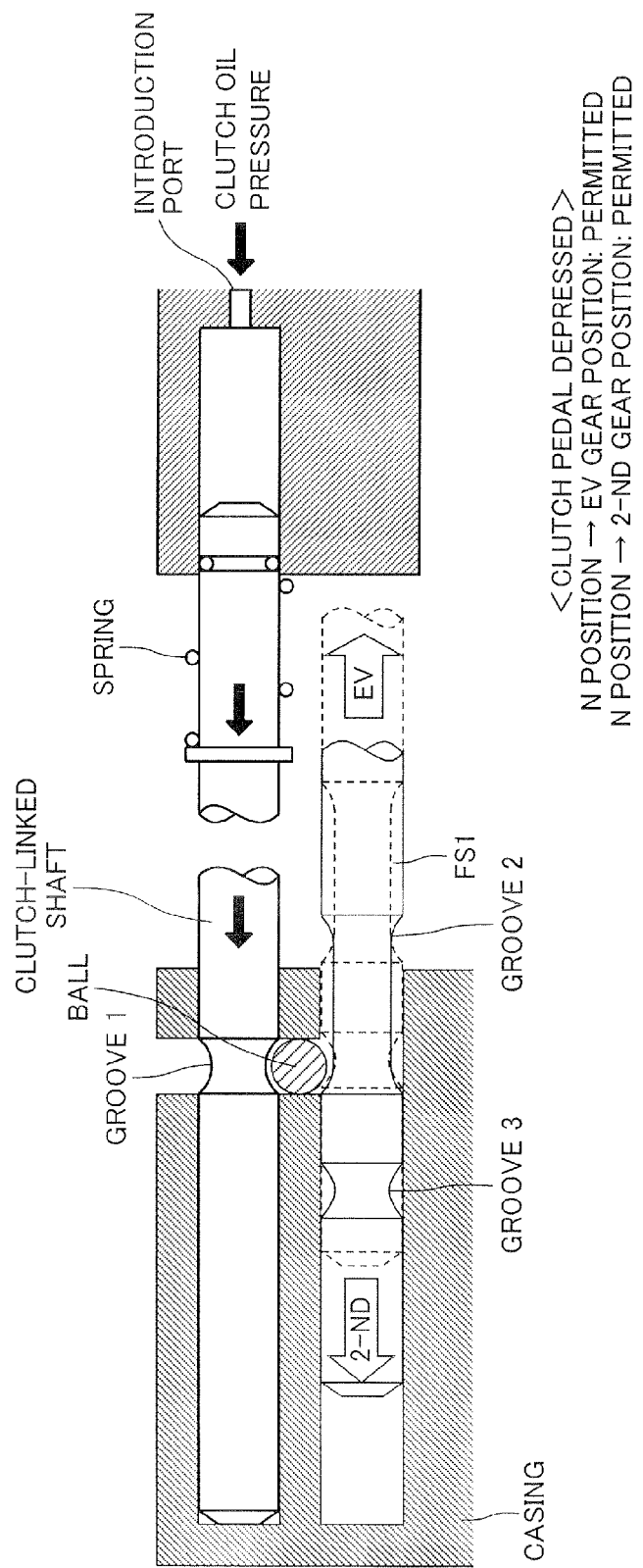
FIG. 19 is a view corresponding to FIG. 18 and showing a state in which the clutch pedal is depressed.
Figure 20:
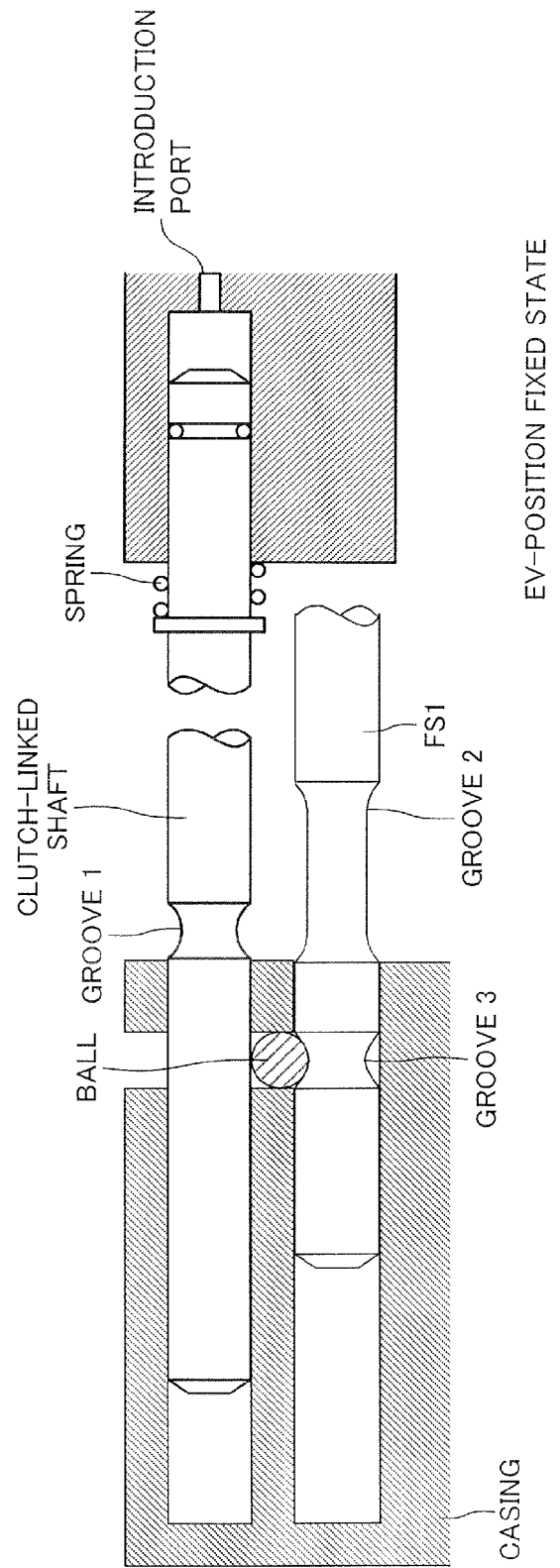
FIG. 20 is a view corresponding to FIG. 18 and showing a state in which the shift lever is fixed to the EV-gear-stage shift completion position.

As shown in FIGS. 18 to 20, a second embodiment differs from the above-described first embodiment in that the axis of the clutch-linked shaft is parallel to the axis of the fork shaft FS1 and that, in a state in which the clutch pedal CP is not depressed, the clutch-linked shaft and a ball cooperate so as to prohibit movement of the fork shaft FS1 from the neutral position to the EV position.

FIG. 18 shows a state in which the fork shaft FS1 is in the neutral position and the clutch pedal CP is not depressed. In this state, due to the urging force of a spring which always urges the clutch-linked shaft rightward in FIG. 18, the clutch-linked shaft is located at a rightward position, and a ball engages with a portion of the side surface of the clutch-linked shaft where a groove 1 is not formed, and engages with a groove 2 formed on the side surface of the fork shaft FS1. Since the ball cannot move upward from the position shown in FIG. 18 and the ball butts against the left end portion of the groove 2 in FIG. 18, movement of the fork shaft FS1 from the neutral position to the EV position (rightward movement in FIG. 18; accordingly, movement of the shift lever SL from the N position to the EV-gear-stage shift completion position) is prohibited. Meanwhile, movement of the fork shaft FS1 from the neutral position to the 2 gear position (leftward movement in FIG. 18; i.e., movement of the shift lever SL from the N position to the 2-nd-gear-stage shift completion position) is permitted.

FIG. 19 shows a state in which the fork shaft FS1 is in the neutral position and the clutch pedal CP is depressed. In this state, due to the "clutch oil pressure" which is introduced into the interior of the casing through an introduction port of the casing, the clutch-linked shaft moves leftward in FIG. 19 against the urging force of the spring. As a result, the ball engages with the groove 1 of the clutch-linked shaft. Accordingly, the ball becomes able to move upward from the position shown in FIG. 18, and movement of the fork shaft FS1 from the neutral position to the EV position (rightward movement in FIG. 19; accordingly, movement of the shift lever SL from the N position to the EV-gear-stage shift completion position) is permitted. Furthermore, movement of the fork shaft FS1 from the neutral position to the 2 gear position (leftward movement in FIG. 19; i.e., movement of the shift lever SL from the N position to the 2-nd-gear-stage shift completion position) is also permitted.

As shown in FIG. 20, in this second embodiment, in a state in which the fork shaft FS1 is in the EV position and the clutch pedal CP is not depressed, the ball engages with a portion of the side surface of the clutch-linked shaft where the groove 1 is not formed, and engages with a groove 3 formed on the side surface of the fork shaft FS1. As a result, unless the clutch pedal CP is depressed, movement of the fork shaft FS1 from the EV position (i.e., movement of the shift lever SL from the EV-gear-stage shift completion position) is prohibited. That is, the movement restraining mechanism of this second embodiment includes the above-mentioned "lock mechanism."

Notably, as in the case of the above-described first embodiment, the second embodiment may be modified such that, through utilization of, for example, tension of a wire generated in accordance with the operation quantity (depression amount) of the clutch pedal CP, the clutch-linked shaft is moved in the axial direction in accordance with the operation of the clutch pedal CP.

Third Embodiment

Figure 21:
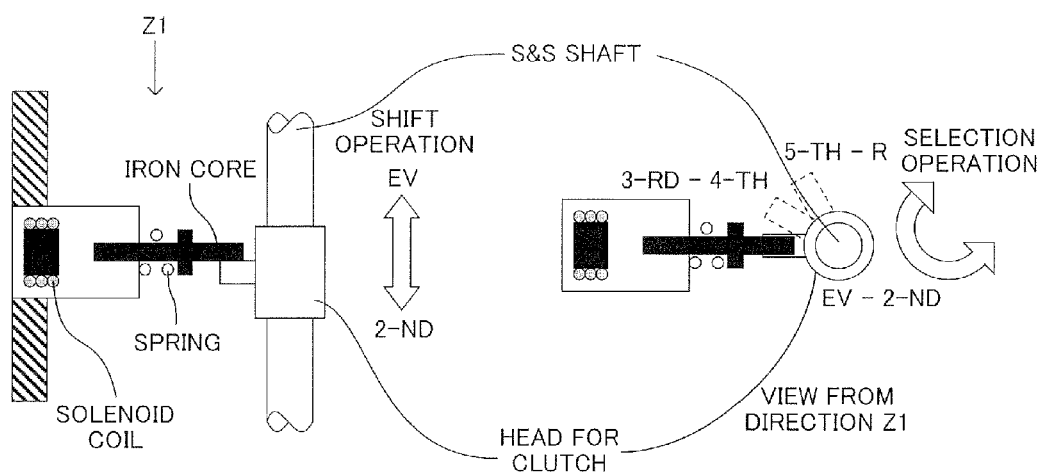
FIG. 21 is a schematic view of a third example of the movement restraining mechanism.

As shown in FIG. 21, a third embodiment differs from the first and second embodiments in that, in a state in which the clutch pedal CP is not depressed, in place of the fork shaft FS1, the S&S shaft is prohibited from moving, and in that an electromagnetic force of a solenoid coil is utilized in place of the clutch oil pressure. In this third embodiment, the above-mentioned "selection-rotation-type" S&S shaft is used.

Figure 22:
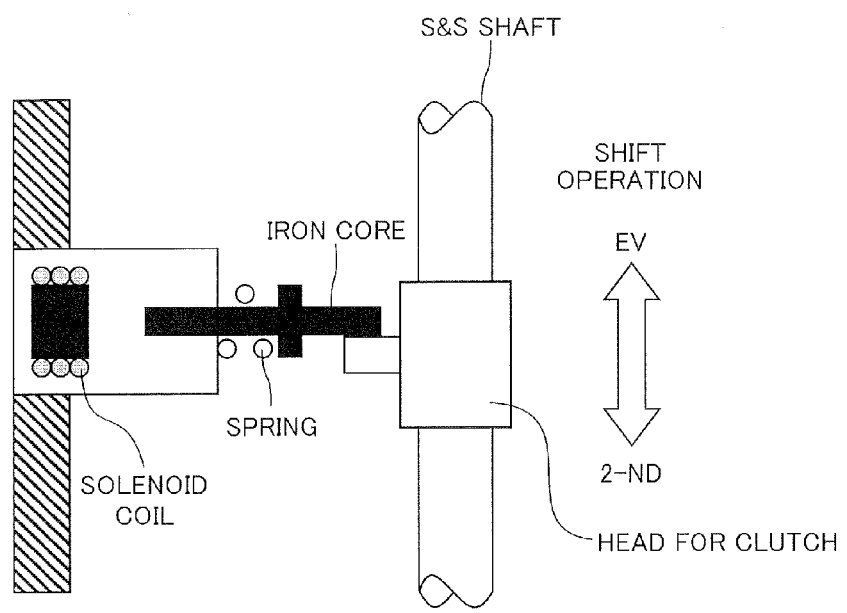
FIG. 22 is a view corresponding to FIG. 21 and showing a state in which the clutch pedal is not depressed.

FIG. 22 shows a state in which the S&S shaft is in the neutral position and the clutch pedal CP is not depressed. In this state, the solenoid coil is not energized. Accordingly, due to the urging force of a spring which always urges the iron core rightward in FIG. 22, the iron core projects rightward. As a result, in a state in which the "EV gear—2-nd gear" is selected by the selection operation, a protrusion of a head for clutch integrally coupled with the S&S shaft butts against a front end portion of the iron core. Thus, movement of the S&S shaft from the neutral position to the EV gear position (upward movement in FIG. 22) is prohibited. In other words, movement of the shift lever SL from the "EV-2 selection position" to the EV-gear-stage shift completion position is prohibited. Meanwhile, movement of the S&S shaft from the neutral position to the 2-nd gear position (downward movement in FIG. 22; i.e., movement of the shift lever SL from the "EV-2 selection position" to the 2-nd-gear-stage shift completion position) is permitted.

Figure 23:
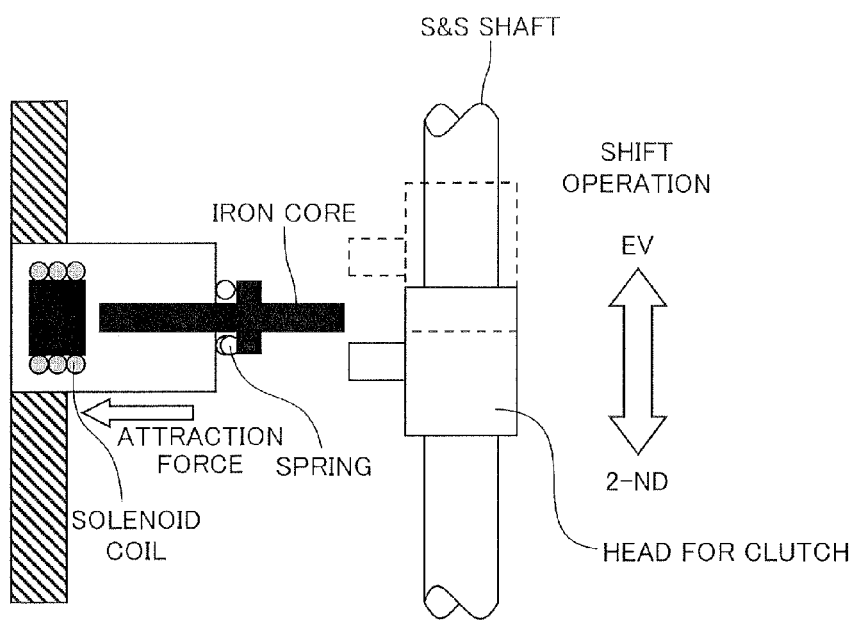
FIG. 23 is a view corresponding to FIG. 21 and showing a state in which the clutch pedal is depressed.

FIG. 23 shows a state in which the S&S shaft is in the neutral position and the clutch pedal CP is depressed. In this state, the solenoid coil is energized. This energization can be started and performed, for example, when the depression amount of the clutch pedal CP detected by the clutch operation amount sensor P1 exceeds a predetermined value. As a result of the energization, an attraction force acts between the solenoid coil and the iron core, whereby the iron core moves leftward in FIG. 23 against the urging force of the spring. As a result, in a state in which the "EV gear—2-nd gear" is selected by the selection operation, the protrusion of the head for clutch integrally coupled with the S&S shaft disengages from the front end portion of the iron core. Thus, movement of the fork shaft FS1 from the neutral position to the EV gear position (upward movement in FIG. 23; i.e., movement of the shift lever SL from the "EV-2 selection position" to the EV-gear-stage shift completion position) is permitted. Moreover, movement of the fork shaft FS1 from the neutral position to the 2-nd gear position (downward movement in FIG. 23; i.e., movement of the shift lever SL from the "EV-2 selection position" to the 2-nd-gear-stage shift completion position) is permitted.

Fourth Embodiment

Figure 24:
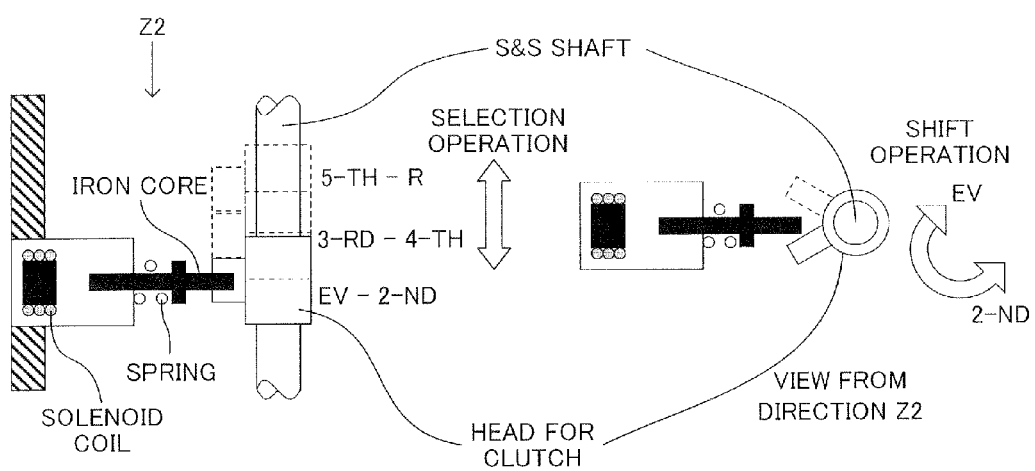
FIG. 24 is a schematic view of a fourth example of the movement restraining mechanism.
Figure 25:
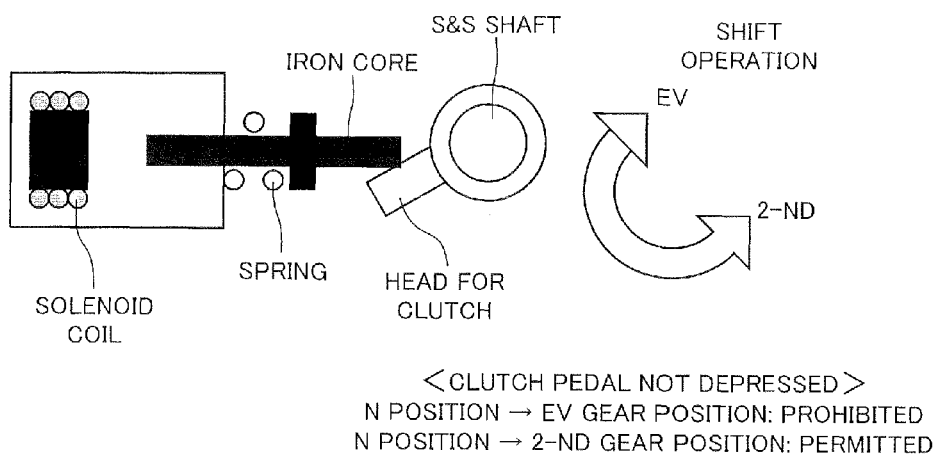
FIG. 25 is a view corresponding to FIG. 24 and showing a state in which the clutch pedal is not depressed.
Figure 26:
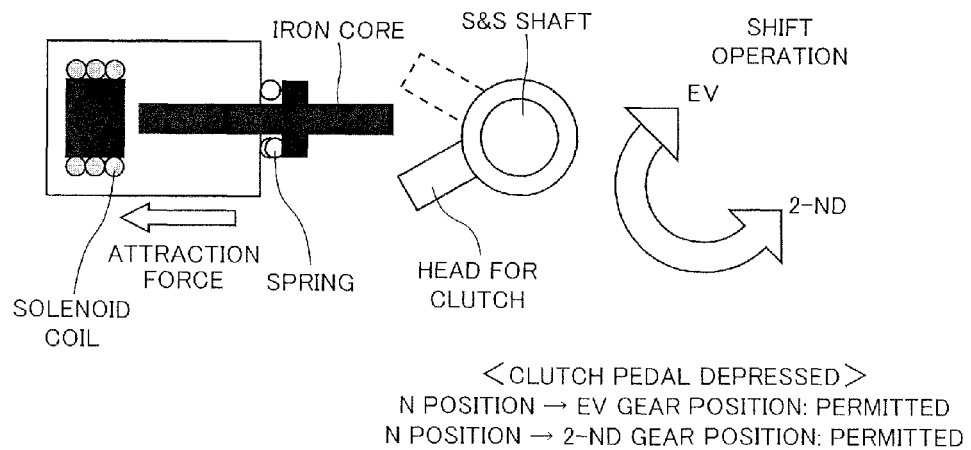
FIG. 26 is a view corresponding to FIG. 24 and showing a state in which the clutch pedal is depressed.

As shown in FIGS. 24 to 26, a fourth embodiment differs from the above-described third embodiment only in that the above-mentioned "shift-rotation-type" S&S shaft is used in place of the above-mentioned "selection-rotation-type" S&S shaft. The remaining configuration and operation are the same as those of the third embodiment. Accordingly, description of specific operation of the fourth embodiment will be omitted.

(Action and Effects)

As described above, in the power transmission control apparatus according to the present embodiment, the manual transmission M/T includes a "movement restraining mechanism" (refer to the first through fourth embodiments shown in FIGS. 15 to 26). Accordingly, a driver is demanded to depress the clutch pedal CP in order to move the shift lever SL from the neutral position to the EV-travel-stage shift completion position. In other words, the operation of depressing the clutch pedal CP is demanded when the shift lever SL is moved from the neutral position to the shift completion position of any gear stage. As a result, it is possible to prevent occurrence of a situation where the driver is confused about whether to operate the clutch pedal CP at the time of gear change.

In addition, the modification of the first embodiment (refers to FIG. 17) and the second embodiment (refers to FIG. 20) of the "movement restraining mechanism" further includes a "lock mechanism." Accordingly, the drive is further demanded to depress the clutch pedal CP when the driver returns the shift lever SL from the EV-travel-stage shift completion position to the neutral position. In other words, the driver is further demanded to depress the clutch pedal CP when the driver moves the shift lever SL from the shift completion position of any gear stage to the neutral position. As a result, it is possible to more reliably prevent occurrence of a situation where the driver is confused about whether to operate the clutch pedal CP at the time of gear change.

The present invention is not limited to the above-described embodiments, and various modifications may be employed without departing from the scope of the present invention. For example, in the above-described embodiments, all the sleeves S1, S2, and S3 are provided on the input shaft Ai. However, all the sleeves S1, S2, and S3 may be provided on the output shaft Ao. Alternatively, some of the sleeves S1, S2, and S3 may be provided on the output shaft Ao, and the remaining sleeve(s) may be provided on the input shaft Ai.

In the above-described embodiments, the changeover between the "EV gear" and the "2-nd gear" is performed by changing the axial position of the sleeve S1 (the above-mentioned "specific sleeve") (that is, the above-mentioned "specific gear stage is set to the "2-nd gear"). However, the above-described embodiments may be modified such that the changeover between the "EV gear" and any of the HV travel gear stages other than the "2-nd gear" (any of the "3-rd gear" to the "5-th gear") is performed by changing the axial position of the sleeve S1 (the above-mentioned "specific sleeve").

In the above-described embodiments, the "movement restraining mechanism" is configured to prohibit movement of the member (specifically, the S&S shaft or the specific fork shaft FS1) linked to the shift lever SL in a state in which the clutch pedal CP is not depressed. However, the "movement restraining mechanism" may be configured to prohibit movement of the shift lever SL itself in a state in which the clutch pedal CP is not depressed.

The invention claimed is:

1. A power transmission control apparatus for a vehicle which includes an internal combustion engine (E/G) and an electric motor (M/G) as power sources, comprising:
   a manual transmission (M/T) which does not include a torque converter and includes:
   an input shaft (Ai) which receives power from the internal combustion engine,
   an output shaft (Ao) which receives power from the electric motor and which outputs power to a drive wheel of the vehicle, and
   a transmission mechanism (M) configured such that when a driver moves a shift operation member (SL) on a shift pattern to a hybrid-travel-stage shift completion position corresponding to a selected one of a plurality of gear stages (2-nd to 5-th gears) for hybrid travel in which the vehicle travels using both drive force of the internal combustion engine and drive force of the electric motor, the transmission mechanism establishes a power transmission route between the input shaft and the output shaft, the power transmission route having a transmission speed reduction ratio, which is the ratio of rotational speed of the input shaft to that of the output shaft, for the selected gear stage, and when the driver moves the shift operation member on the shift pattern to a motor-travel-stage shift completion position corresponding to a gear stage (EV gear) for motor travel in which the vehicle travels using only the drive force of the electric motor, the transmission mechanism establishes no power transmission route between the input shaft and the output shaft; and
   a friction clutch (C/T) which is interposed between the output shaft (Ae) of the internal combustion engine and the input shaft (Ai) of the manual transmission and whose engagement state changes in accordance with an operation quantity of a clutch operation member (CP) operated by the driver, wherein the transmission mechanism includes a movement restraining mechanism configured such that in a state in which the clutch operation member is not operated, the movement restraining mechanism prohibits movement of the shift operation member, on the shift pattern, to the motor-travel-stage shift completion position from a neutral position which differs from the motor-travel-stage shift completion position and in which no power transmission route is established between the input shaft and the output shaft, and in a state in which the clutch operation member is operated, the movement restraining mechanism permits movement of the shift operation member, on the shift pattern, from the neutral position to the motor-travel-stage shift completion position.

2. A power transmission control apparatus for a vehicle according to claim 1, wherein the transmission mechanism includes:
a plurality of stationary gears (G2$i$, G3$i$, G4$i$, G5$i$) non-rotatably provided on the input shaft (Ai) or the output shaft (Ao) of the transmission and corresponding to the plurality of gear stages for hybrid travel;
a plurality of idle gears (G2$o$, G3$o$, G4$o$, G5$o$) rotatably provided on the input shaft or the output shaft, corresponding to the plurality of gear stages for hybrid travel, and always meshing with the stationary gears of the corresponding gear stages for hybrid travel;
a plurality of sleeves (S1, S2, S3) provided on corresponding one of the input shaft and the output shaft such that the sleeves cannot rotate in relation to the corresponding shaft and can axially move in relation to the corresponding shaft, each of the sleeves being capable of engaging with a corresponding one of the plurality of idle gears so as to non-rotatably fix the corresponding idle gear to the corresponding shaft;
a plurality of fork shafts (FS1, FS2, FS3) respectively connected to the plurality of sleeves and being movable in the axial direction; and
a shift and selection shaft which causes one of movement in the direction of its axis and rotation around the axis as a result of a selection operation of the shift operation member, the selection operation being an operation on the shift pattern in a left-right direction of the vehicle, and causes the other of the movement in the direction of its axis and the rotation around the axis as a result of a shift operation of the shift operation member, the shift operation being an operation on the shift pattern in a front-back direction of the vehicle,
the transmission mechanism being configured such that a corresponding fork shaft is selected from the plurality of fork shafts through the selection operation of the shift operation member, and an inner lever (IL) projecting from a side surface of the shift and selection shaft pushes and moves the selected fork shaft in its axial direction trough the shift operation of the shift operation member whereby a corresponding gear stage is achieved, wherein
one of the plurality of sleeves is a specific sleeve (S1) which can engage with the idle gear (G2$o$) of a specific gear stage (2-nd gear), which is one of the plurality of gear stages for hybrid travel, so as to non-rotatably fix the idle gear to the corresponding one of the input shaft and the output shaft;
one of the plurality of fork shafts is a specific fork shaft (FS1) coupled with the specific sleeve, the specific fork shaft being pushed by the inner lever to move from its neutral position to a first position, in which the specific sleeve does not engage with the idle gear of the specific gear stage, as a result of movement of the shift operation member from the neutral position to the motor-travel-stage shift completion position, and the specific fork shaft being pushed by the inner lever to move from its neutral position to a second position which is located opposite the first position with respect to the neutral position and in which the specific sleeve engages with the idle gear of the specific gear stage, as a result of movement of the shift operation member from the neutral position to the shift completion position of the specific gear stage, and
the movement restraining mechanism is configured such that in a state in which the clutch operation member is not operated, the movement restraining mechanism prohibits motion of the shift and selection shaft or the specific fork shaft produced as a result of movement of the shift operation member from the neutral position to the motor-travel-stage shift completion position, and in a state in which the clutch operation member is operated, the movement restraining mechanism permits the motion of the shift and selection shaft or the specific fork shaft produced as a result of movement of the shift operation member from the neutral position to the motor-travel-stage shift completion position.

3. A power transmission control apparatus for a vehicle according to claim 2, wherein the movement restraining mechanism includes a moving member (clutch-linked shaft, iron core) which is in a first state when the clutch operation member is not operated and is brought into a second state when the clutch operation member is operated, wherein the moving member in the first state hinders the motion of the shift and selection shaft or the specific fork shaft produced as a result of movement of the shift operation member from the neutral position to the motor-travel-stage shift completion position, and the moving member in the second state does not hinder the motion of the shift and selection shaft or the specific fork shaft produced as a result of movement of the shift operation member from the neutral position to the motor-travel-stage shift completion position.

4. A power transmission control apparatus for a vehicle according to claim 2, wherein the specific gear stage is a gear stage (2-nd gear) having the largest transmission speed reduction ratio among the plurality of gear stages (2-nd gear to 5-th gear) for hybrid travel.

5. A power transmission control apparatus for a vehicle according to claim 1, wherein the movement restraining mechanism includes a lock mechanism which prohibits movement of the shift operation member from the motor-travel-stage shift completion position in a state in which the clutch operation member is not operated, and permits movement of the shift operation member from the motor-travel-stage shift completion position in a state in which the clutch operation member is operated.

* * * * *